United States Patent [19]
Penque

[11] 3,850,771

[45] Nov. 26, 1974

[54] MAKING OF USEFUL PRODUCTS FROM CELLULOSE-CONTAINING GARBAGE

[75] Inventor: Ronald A. Penque, Glen Ridge, N.J.

[73] Assignee: Biocel Corporation, Glen Ridge, N.J.

[22] Filed: Jan. 8, 1971

[21] Appl. No.: 105,123

[52] U.S. Cl............... 264/176, 106/163, 106/164, 106/168, 264/330
[51] Int. Cl.......................... B29b 1/00, C08d 9/08
[58] Field of Search................ 106/164, 168, 163; 264/176, 330

[56] References Cited
UNITED STATES PATENTS

| | | | |
|---|---|---|---|
| 826,351 | 7/1906 | Olivier | 106/164 |
| 1,213,115 | 1/1917 | Lieber | 106/164 |
| 2,049,311 | 7/1936 | Osgood et al. | 106/164 |
| 3,330,088 | 7/1967 | Donlea | 264/332 |

FOREIGN PATENTS OR APPLICATIONS

| | | | |
|---|---|---|---|
| 154,574 | 1922 | Great Britain | 106/163 |
| 473,355 | 1937 | Great Britain | 106/163 |

*Primary Examiner*—Allan Lieberman
*Attorney, Agent, or Firm*—Morton C. Jacobs

[57] ABSTRACT

Useful structural products such as blocks, boards, strips and pellets are made from garbage by utilizing the cellulose content of the garbage as a binder for the garbage proper. A small portion of the garbage to be made into a useful product is removed from the mass of the garbage and is subjected to a xanthation process, converting the cellulose to cellulose xanthate. The thus converted cellulose xanthate is then mixed with the main mass of garbage, and that mixture is then subjected to conditions suitable to convert the cellulose xanthate to cellulose. the thus-formed cellulose acts as a binder for the mass of garbage, ensuring that it will retain its shape after formation by molding, extrusion or the like.

9 Claims, No Drawings

MAKING OF USEFUL PRODUCTS FROM CELLULOSE-CONTAINING GARBAGE

The present invention relates to a method for forming useful products from cellulose-containing garbage.

The effective disposal of waste products is becoming an ever more critical problem. A modern society produces massive amounts of waste material, and that waste material must be treated and disposed of. Various types of garbage treatment have been proposed in the past, those treatment methods in the main producing end products which are either useless or have only a limited degree of use, such as for land fill or the like. The cost of garbage disposal is a very important matter to municipalities, and when the end products of that disposal are not useful in and of themselves, or are only of limited utility, the overall cost of the garbage disposal procedure is maximized.

Accordingly, proposals have been made in the past for acting upon the garbage at some stage in its treatment so as to form therefrom relatively useful products, such as structurally usable sheets, strips, and bars. While such structurally usable objects have more value than mere land fill, and thus potentially represent a source of great saving to a municipality, several drawbacks have in the past prevented this approach from being utilized to any substantial extent. In the first place, the garbage itself does not have a self-binding characteristic, and consequently it has been necessary to add binding materials to the garbage in order that the end products should have sufficient self-sustaining strength. This binding material is, of course, a source of expense. Moreover, such binding materials as have been used in the past have not been particularly effective in producing end products of appreciable self-sustaining structural strength. Accordingly, while the desirability of making structural products from appropriately treated garbage material has long been appreciated, the accomplishment of that desired end has presented serious problems to the art.

We have discovered that there are components in garbage which can be utilized, through a simple and inexpensive treatment procedure, to act as a very effective binder for the garbage material, thus permitting the production of structurally usable products from garbage without having to add any special binding materials. Not only does this greatly reduce the cost of manufacture of such structural materials, but the materials produced are highly effective for their desired utilization.

More specifically, virtually all garbage contains cellulose. The proportion of cellulose in garbage will vary depending upon the particular locality, but in modern industrialized areas the proportion of cellulose in garbage is quite high. A very large proportion of waste material which must be disposed of by municipalities toay consists of discarded packaging material, and that packaging material is to a great extent made up of cellulose-type materials. In the United States, for example, it is usual for 50 to 60% of the garbage treated by a municipality to be composed of paper and paper pulp. Cellulose contents of garbage mixes in the United States often run between 40 and 75%. This cellulose content of the garbage can be treated by a process previously known per se but not heretofore applied to this particular application, to convert the cellulose to cellulose xanthate, a non-binder which is quite soluble. That cellulose xanthate may then be mixed with the mass of garbage which is to be formed into suitable useful products, and the mixture is then subjected to conditions suitable to convert the cellulose xanthate back into cellulose. That conversion of cellulose xanthate back to cellulose can be accomplished in various known ways, e.g. by removing water from the mixture through the use of pressure or heat or both, or by changing the pH of the mixture appropriately. The precipitated cellulose acts as an effective binder for the mass of garbage with which it has been combined. The thus-bound mass can then be formed into any suitable shape, such as the shape of bars, strips, sheets or pellets, and after drying the thus-shaped garbage will constitute a strong and sturdy structural element.

The shaping of the garbage mixture can be combined with the step of converting the cellulose xanthate into cellulose - if the water-containing mixture of the mass of garbage and the cellulose xanthate is molded at high pressures while permitting the liquid expressed from the mixture to escape, the removal of the liquid causes the precipitation of cellulose and the same pressure which causes the liquid to be removed also shapes the end product. Another way in which useful end products can be formed is to subject the mixture to a cellulose-precipitating condition such as changing its pH to an appropriate value and then promptly extruding material through any suitable extruding press, the precipitated cellulose acting to bind together the mass as it is extruded, either in the form of a continuous strip or in the form of pellets or in any other form.

The method of the present invention is effective for use with garbage of virtually any type, so long as it contains an appreciable amount of cellulose. It may constitute anaerobically treated garbage masses, aerobically treated masses, composted masses, or merely finely ground garbage. There is no particular requirement, insofar as the present invention is concerned, as to what type of prior treatment the garbage materials have been subjected to, nor is there any requirement that they be subjected to any prior treatment at all. However, it will usually be desirable to subject the garbage to a certain amount of conventional pre-treatment in order to remove its odor and make it of a fine enough consistency so that the products produced by the method of the present invention will be acceptable from an aesthetic point of view.

What is done in accordance with the present invention is to extract from a small quantity of the overall garbage mass one of the chief components of that quanity of garbage, to wit, its cellulose content, and to so treat that cellulose as to render it effective to serve as a binding material for the mass of the garbage from which it initially came. That cellulose, as it initially existed in the garbage, was not a binder at all, but was instead a useless and often objectionable component of the garbage material, which presented problems to municipalities in connection with garbage disposal. In accordance with the present invention this previously useless and often objectionable material is now utilized in a very effective way so that useful products, such as building blocks, wood substitutes, paving materials, or pelletized aggregates and the like, may be formed from garbage in an effective and economical manner.

It is therefore one of the prime objects of the present invention to devise a method for treating garbage which will permit the formation therefrom of useful products in an economical and effective manner.

It is a further object of the present invention to so treat cellulose-containing garbage as to convert at least a portion of the cellulose content thereof into a binder material which will function to maintain the garbage mass in a particular shape.

It is another object of the present invention to so treat normally unbound garbage as to impart thereto an effective self-binding action, thereby permitting the garbage mass to be shaped to suitable structurally strong pieces or masses.

We accomplish these results by subjecting at least a portion of the cellulose content of the garbage mass which is to be formed into a useful product to a chemical reaction known as xanthation. In the course of that reaction the cellulose is first treated with an alkali to produce alkali cellulose, it is then preferably subjected to an oxidative cleavage action in which shorter chains of the cellulose are formed, and it is then reacted with carbon disulfide. Under proper conditions the compound known as cellulose xanthate results. That compound is present either in the form of a disolved compound or a gel, and it may readily be dispersed into the mass of garbage which is to be treated in accordance with the present invention. In the form of cellulose xanthate, the cellulose does not exert any appreciable binding effect, but in the form of cellulose xanthate it may very readily be distributed substantially uniformly and completely throughout the mass of garbage to be treated. The garbage-binding material is the particular form of cellulose which results from precipitation from the cellulose xanthate form. This conversion and precipitation can be carried out in various ways. One known way is to remove the water or moisture in which the cellulose xanthate ia dissolved or by which it is carried in the form of a gel. When the water or moisture is removed the cellulose xanthate changes its form and reverts to a particular type of cellulose, which type of cellulose, now uniformly distributed throughout the garbage mass, has a very appreciable and effective binding action on the remainder of the garbage. Another way known for conversion of cellulose xanthate into a binding form of cellulose is to change the pH of the mixture. Cellulose xanthate remains in solution or in gel form in an alkaline environment, and if the pH of the mixture is changed to an acidic one the cellulose xanthate will convert into cellulose binder.

Xanthation as such, and the various reactions employed to forms cellulose xanthate and to change cellulose xanthate back into cellulose, have long been known. They are used, for example, in the formation of viscose, and it is also known that viscose exhibits an adhesive characteristic. Thus no claim is here made to the xanthation process itself, nor to the process used for precipitating cellulose from cellulose xanthate, nor broadly to the use of such cellulose because of its adhesive properties. Indeed, the prior knowledge with respect to the xanthation and allied reactions make it clear that many variations may be made in the specific reaction conditions to which the garbage is subjected in accordance with the present invention, all as is well known to those skilled in the art.

What is unique here, it is believed, is the utilization of the main component of processed solid waste as a binder for the total mass, that main component - non-degraded cellulose - being useless as a binder as it is found in the solid waste mass, but becoming exceedingly useful as a binder when processed as here described.

So effective is the xanthate-precipitated cellulose as a binder for garbage masses of the type under discussion that only a relatively small portion of the cellulose content of the garbage need be treated in accordance with the present invention in order to produce a quite satisfactory binding effect. This, of course, is a source of great money saving. Moreover, the materials employed to produce the cellulose xanthate are either quite inexpensive or may be largely reclaimed and reused as the process is carried out on successive masses of garbage or both, thus further emphasizing the economic factors involved in the present invention.

The present invention may be carried out by taking a small proportion of the total mass of solid waste, typically as little as 1% of the total mass, and subjecting that quantity to xanthation conditions so as to convert preferably substantially all of the cellulose content of that selected quantity of garbage into cellulose xanthate. The particular proportion of the total garbage mass to be thus treated will vary depending upon the cellulose content of the garbage. The higher the cellulose content the smaller need be the quantity treated, since what is required is a certain amount of binder for the total mass. Since this binder comes from the cellulose content of the garbage, the more cellulose there is in a given volume of weight of garbage, the less is the volume or weight of the garbage which must be treated in order to produce the needed amount of binding material.

The thus selected quantity of garbage subjected to treatment by an ionized alkali, such as sodium hydroxide, potassium hydroxide or ammonium hydroxide. There must be enough moisture present in the treated quantity to permit the alkali to ionize. If such moisture is not present in the garbage as it comes to the treatment, it should be added, either separately from or with the alkali. The amount of alkali added will vary widely depending upon the condition of the garbage when it is first treated. If that garbage is initially acidic additional alkali will be required since the acidic condition must first be neutralized before the remainder of the alkali is available to act on the cellulose content of the solid waste material. A typical quantity may be the use of an 18 – 20% sodium hydroxide solution in an amount 2.8 times by weight of the cellulose content of the selected quantity of waste material. In some instances that amount may be as low as 1.8 times the weight of the cellulose content of the compost, but there is no known disadvantage to utilizing excess of alkali, and it is believed that there are certain advantages in using such an excess, since the greater the alkali content the more effectively is a slurry formed and the better is the mixing. When a sodium hydroxide solution of the type described is present in the described amount of 2.8 times the weight of the cellulose content of the treated material, this has been found to provide proper solubility of the various components after they are mixed with the main mass of garbage. Since that amount of alkali gives excellent results, it would appear to be uneconomical to utilize more than that amount, but if more than that amount is used no adverse chemical effects would be expected to occur. The alkali as added may be in a more concentrated form than that described above, for example, it may be a 70% solution, without ill effects, provided that there is sufficient liquid so that the alkali can ionize, The selected quantity of garbage is thus treated with alkali for a period of time and at a temperature such as a permit the alkali to convert substantially all of the cellulose content of the mixture being treated into alkali cellulose, according to the following reaction:

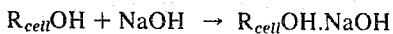

$$R_{cell}OH + NaOH \rightarrow R_{cell}OH \cdot NaOH$$

It may be subjected to temperatures between 15°C and 30°C for a period of time between two hours and 15 minutes, with a value of 25°C for a period of one hour being quite satisfactory. At the end of this time if excess alkali has been present preferably it is removed so as to leave alkali present only to the amount of 2.8 times the weight of the cellulose content of the compost, in order to facilitate subsequent reactions, but this step is not essential.

Next the thus-formed alkali cellulose combined with the quantity of garbage initially treated preferably is subjected to an aging step under oxidation conditions. This may be done merely by exposing the mixture to air for an appreciable period of time and at an appropriate temperature. In a typical instance, under ambient conditions, temperatures may vary between 20°C and 35°C, with a time of 48 hours to 2 hours. A temperature of 28°C for 12 hours is quite satisfactory. One may accelerate the oxidative cleavage step by subjecting the mixture to elevated temperatures, such as temperatures between 50°C and 65°C, in which case the time involved may range from 4 hours to 15 minutes. An elevated temperature of 55°C for a period of 1 hour is satisfactory. During this time the alkali cellulose is subjected to oxidation conditions which results in depolymerization and the forming of shorter length cellulose chains of the formula $R'_{cell}ONa$.

Next the alkali cellulose in the selected quantity of garbage is subjected to the xanthation reaction proper to form

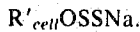

$$R'_{cell}OSSNa.$$

The carbon disulfide is applied to the mixture in any desired fashion. The reaction may take place in a vacuum chamber or in an open vessel (although an open vessel has the disadvantage that some of the carbon disulfide will be lost through volatilization). It is preferred that the mixture be agitated while the carbon disulfide is applied thereto in order to facilitate the resulting reactions and to ensure that the carbon disulfide reaches and reacts with all of the alkali sulfate in the quantity of material being treated. The xanthation should proceed until from 0.5 to 2.0 hydroxyl units are reacted for each anhydroglucose unit. Suitable temperatures of reaction are between 25°C and 35°C with a temperature of 30°C being satisfactory, and the reaction is permitted to continue for a period of 1 to 2 hours, with a period of 1½ hours being preferred. The nature of the reaction which takes place at this time will be determined to some extent by the amount of alkali present. There are certain reactions which complete with the reaction set forth above and those competing reactions are inhibited by its alkali content being relatively low. The value of 2.8 times the weight of the cellulose content of the compost set forth above with respect to the 18–20% sodium hydroxide solution is believed to be an excellent alkali value to be maintained during the xanthation reaction for optimum effect.

After the xanthation reaction has been completed, the selected quantity of garbage, with its cellulose content now converted substantially completely to cellulose xanthate, is then mixed back with the main body of garbage from which that treated quantity had initially been taken (although it is, of course, not essential that the xanthated garbage be mixed with the very same mass from which it was originally taken; it would function just as well with any other mass of garbage). Preferably the mixture is made quite thorough, so that the cellulose xanthate is substantially completely and uniformly distributed throughout the garbage mass. In order that this may be accomplished it is usually necessary that the garbage mass have an appreciable moisture content. If that moisture is not present, it is desirable to add moisture to the garbage to enable the proper distribution of cellulose xanthate to be accomplished. Moreover, the combination of garbage mass and the treated material should have an alkaline pH, preferably between 8.5 and 9.5. If the garbage is not sufficiently alkaline, alkali should be added thereto.

Next the mixture of garbage and cellulose xanthate is subjected to conditions which will cause the cellulose xanthate to convert back to a form of cellulose and to precipitate from the solution in which the cellulose xanthate exists. (It is possible that the cellulose xanthate may not strictly speaking be present as a solute but instead may be present in the form of a gel. The term "solution" as here used is intended to encompass either or both of those states.) As has been previously indicated, two known ways for thus converting cellulose xanthate to cellulose are the removal of moisture from the system or the conversion of the system from an alkaline one to an acidic one.

Since the mass of waste material is to be formed into a useful shape, the very process of thus forming it may be utilized to convert the cellulose xanthate to cellulose. Thus if the mass is placed in a mold and compressed at high pressure, the mold being so constructed as to permit the moisture forced out of the mass by the high compression to escape, the mass will simultaneously be shaped to desired form and, because the moisture is expressed therefrom, the cellulose xanthate converted to cellulose in a form which inherently acts as a very strong binder for the material, thus causing that material to retain its molded shape. If the mixture is to be subjected to an extrusion operation, it is sometimes found that the extrusion process is not sufficiently effective in removing moisture from the material, thereby to cause sufficient conversion of cellulose xanthate to cellulose. In those conditions it may be desirable to add acids or acid salts to the mixed material shortly prior to extrusion, thereby to change the pH of the mixture from alkaline to acidic and thus causing precipitation of cellulose. In this way a continuous strip or sheet may be extruded, from which the excess of moisture can later be removed by evaporation or compression if desired. It also may be found advantageous to utilize the acid precipitation step even when molding of the product is to be carried out.

After molding, extrusion or any other type of shaping, the end product is preferably subjected to drying conditions, thereby to cause substantially all of the moisture therein to be removed therefrom. This not only may be necessary for the end use to which the shaped products are to be put, but it also ensures substantially complete conversion of the cellulose xanthate to the cellulose binder form, thus maximizing the strength of the end product.

We set forth below certain specific examples of the application of our process to various types of waste material. These Examples I, II, III, IV have been performed and completed in the manner indicated.

*Example* I: To 100 grams of compost from a Jamaican windrow operation (Jamaican waste generally contains a smaller cellulose content than waste found in U.S. cities) 200 grams of 15% sodium hydroxide solution are added and the entire mass is agitated for a period of from 2 to 4 hours. The excess liquid is then filtered out and saved for reuse after readjustment of the sodium hydroxide content. To the remaining mass 40 to 100 parts of carbon disulfide are added and the material is agitated for an additional 4 hours. 7% sodium hydroxide is then added in such amount as necessary to produce a binder mass of desired consistency capable of readily being mixed with the main body of the compost. That binder mass is then added to the main body of the compost (solid waste) in any appropriate proportions from one to 99 parts by weight. The resulting material may then be subjected to conditions to convert the cellulose xanthate to binding cellulose, as described above, and the end product may be extruded, compressed, molded or the like into useful solid products.

*Example* II: To 100 grams of composted "standardized municipal solid waste" according to a U.S. East Coast Standard as set forth at page 93 of the July 1967 issue of U.S. Public Health Publication No. 1729 entitled "Refuse Reduction Processes", add 50 grams of a 50% solution of sodium hydroxide, 50 grams of carbon disulfide and 50 grams of water. Mix for 2 hours, and then add to 800 grams of compost made from the above Standard. The mixture may then be molded into a block or the like. (This example illustrates that the alkali cellulose formation and xanthation reactions may be carried out substantially simultaneously. These two examples illustrate that the oxidative cleavage for aging step need not be employed, although it is usually desirable that it be employed.)

*Example* III: To 100 grams of aerobically digested solid waste prepare according to U.S. East Coast Standards as set forth in Example II, add 280 grams of a 20 percent solution of sodium hydroxide and agitate slowly for a period of 2 hours, cooling if necessary to maintain temperature aproximately at 25°C. Allow the resulting mixture to stand for a period of 12 hours at 28°C, add 40 grams of carbon disulfide, maintain the mixture at 30°C and agitate for 90 minutes in a closed vessel. Thereafter add the treated mixture to 3000 grams of additional digested solid waste in a ribbon blender and add sufficient 4% solution of sodium hydroxide to make this mass wet enough for easy molding. Blend the mass until uniform, then place in a mold and compress at 7500 psi for 1 second, while providing for escape of water therefrom. After the pressure is released, discharge the shaped object from the mold and age it at 160°F for 24 hours for drying purposes.

*Example* IV: (This example is not as specific as the previous examples, but illustrates certain preferred ranges of operating conditions): to 100 grams of aerobically digested solid waste prepared according to U.S. East Coast Standards as set forth in Example II, add 50 to 400 grams of a 13%–50% solution of sodium hydroxide and mix for from 1 minute to 4 hours. Allow this material to stand for from 1 second to 48 hours under oxidation conditions (exposure to air is satisfactory), and then add thereto 5–205 parts by weight of carbon disulfide. After thorough mixing, add the mixture to from 200 to 10,000 parts by weight of additional processed solid waste containing from one to 5,000 parts of a 0.5 to 13% solution of sodium hydroxide. Then mold product as set forth above in Example III.

It may be noted that if excess amounts of alkali or carbon disulfide are present in the treated initial quantity of solid waste subjected to the xanthation reaction, those excesses, when the thus-treated quantity of waste is mixed with the mass of waste, will serve to form additional binding material by reacting with the cellulose content of the larger mass of waste. Thus the use of excess amounts of alkali or carbon disulfide is not necessarily wasteful.

However, it is believed that better control of the operation, and hence more efficient use of the reacting materials, is accomplished when substantially all of the binder material is made from the selected quantity of waste material which is subjected to the xanthation reaction under appropriately controlled reaction conditions.

It will be noted that the only substances which need be used over and above the available waste material, insofar as the present invention is concerned, are carbon disulfide and an alkali such as sodium hydroxide. The alkali is a very inexpensive material, and the carbon disulfide is recoverable and reusable, so that its cost, too, is very low. This cost factor contrasts most favorably with the cost of resins, tars, or the like, which have been suggested in the past as binding materials which must be added to the waste material.

From the above, it will be seen that through the use of the method of the present invention waste material, after having been treated only sufficiently to satisfy aesthetic requirements, may be readily compacted and shaped into appropriate structural forms of a high degree of structural rigidity, thus converting the waste material into usable objects which can be sold for a significant amount of money. Hence, the overall expense of the waste material processing system is greatly minimized. The reactions involved are simple and may be very readily carried out in inexpensive and readily available equipment.

While but a limited number of embodiments have been here specifically disclosed, it will be apparent that many variations may be made therein, all within the scope of the invention as defined in the following claims.

We claim:

1. A method of making a useful product comprising xanthating solid waste selected from anaerobically treated garbage, aerobically treated garbage, composted garbage or comminuted garbage containing cellulose to form cellulose xanthate, mixing said xanthated solid waste with other such solid waste, and treating said mixture to reconvert the cellulose xanthate in situ to form a binder throughout the solid waste mass.

2. The method of claim 1 wherein said solid waste contains about 40–75% cellulose.

3. The method of claim 1 wherein said solid waste is selected from composted standardized municipal solid waste or aerobically digested solid waste prepared according to U.S. East Coast Standard as set forth in U.S. Public Health Publication No. 1729, July 1967, page 93, or solid composted waste from a Jamaican windrow operation.

4. The method of claim 1 wherein said mixture is compressed to expel water and thus reconvert the cellulose xanthate to cellulose, the compression acting to form said mixture into a discrete shape which is retained by the precipitated cellulose binder.

5. The method of claim 1 wherein said xanthated portion comprises about 1% of the total mass of solid waste.

6. The method of claim 1 wherein said xanthated and unxanthated solid waste portions are derived from the same source.

7. A method of making a useful article comprising removing a portion from a quantity of anaerobically treated garbage, aerobically treated garbage, composted garbage or comminuted garbage containing cellulose and water, alkalizing said portion and then treating it with carbon disulfide to convert the cellulose to cellulose xanthate, mixing said xanthated portion with a mass of unxanthated garbage in quantities so as to produce sufficient binder for the total mass upon regeneration of the cellulose, reducing the pH of the mass to a degree sufficient to reconvert the cellulose xanthate to cellulose in situ, and drying the mass to form the useful article.

8. The method of claim 7 and further comprising the step of extruding the mass in a useful shape prior to said drying.

9. A method of making a useful product comprising alkalizing a portion of solid waste garbage containing cellulose and treating said portion with carbon disulfide to convert the cellulose to cellulose xanthate, mixing said xanthated portion with a mass of unxanthated garbage in quantities so as to produce sufficient binder for the total mass upon regeneration of the cellulose and reducing the pH of the mass to a degree sufficient to reconvert the cellulose xanthate to cellulose in situ, and drying the mass to form the useful product.

* * * * *